United States Patent
Newsam

(10) Patent No.: US 11,723,325 B2
(45) Date of Patent: Aug. 15, 2023

(54) MODULAR COMMERCIAL PLANT CLONING SYSTEM

(71) Applicant: Herbert Newsam, Willamina, OR (US)

(72) Inventor: Herbert Newsam, Willamina, OR (US)

(*) Notice: Subject to any disclaimer, the term of this patent is extended or adjusted under 35 U.S.C. 154(b) by 0 days.

(21) Appl. No.: 17/525,142

(22) Filed: Nov. 12, 2021

(65) Prior Publication Data

US 2022/0061240 A1    Mar. 3, 2022

Related U.S. Application Data

(62) Division of application No. 17/117,754, filed on Dec. 10, 2020, now Pat. No. 11,202,417.

(60) Provisional application No. 62/946,825, filed on Dec. 11, 2019.

(51) Int. Cl.
  *A01G 31/02*    (2006.01)
  *A01G 7/04*    (2006.01)
  *A01G 31/00*    (2018.01)

(52) U.S. Cl.
  CPC .............. *A01G 31/02* (2013.01); *A01G 7/045* (2013.01); *A01G 2031/006* (2013.01)

(58) Field of Classification Search
  CPC .. A01K 31/02; A01K 2031/006; A01K 7/045; A01K 31/06; A01K 9/023; A01K 9/022; A01K 27/006; A01K 27/02; A01K 27/06; A01K 27/001; A01K 27/003
  See application file for complete search history.

(56) References Cited

U.S. PATENT DOCUMENTS

| | | | |
|---|---|---|---|
| 2,928,211 A * | 3/1960 | Martin | A01G 31/06 47/60 |
| 3,660,933 A | 5/1972 | Wong, Jr. | |
| 4,037,360 A | 7/1977 | Farnsworth | |
| 4,312,152 A | 1/1982 | Drury et al. | |
| 5,261,185 A | 11/1993 | Koide et al. | |
| 9,986,697 B1 | 6/2018 | Gurin | |
| 10,072,880 B2 | 9/2018 | Newsam | |
| 10,785,928 B2 | 9/2020 | Hawley-Weld et al. | |
| 10,842,095 B2 | 11/2020 | Ivanescu et al. | |
| 2006/0112630 A1 | 6/2006 | Kimes | |
| 2008/0120903 A1 | 5/2008 | Fair et al. | |

(Continued)

FOREIGN PATENT DOCUMENTS

KR    20170044787    *    4/2017    ............. A01G 31/06

*Primary Examiner* — Trinh T Nguyen
(74) *Attorney, Agent, or Firm* — Boudwin Intellectual Property; Daniel Boudwin

(57) ABSTRACT

A modular commercial plant cloning system and method for stimulating root growth from a plant stem. The system includes a supporting frame, a light source, a fluid reservoir, and a cooling element. The supporting frame further includes a plurality of mounting points for securing a plant holding device tray at a desired height and spacing within the supporting frame below the light source. The plant holding device tray houses a plurality of plant holding devices that the plant stems are placed in during the cloning process. The lower end of the supporting frame includes the fluid reservoir, wherein the fluid reservoir further includes a cooling element therein. Additionally, the fluid delivery system helps transport fluid from the fluid reservoir to the sprayer nozzles which are configured to distribute fluid across the plant stems disposed within the plant holding device tray.

7 Claims, 4 Drawing Sheets

(56) References Cited

U.S. PATENT DOCUMENTS

| | | |
|---|---|---|
| 2010/0218423 A1 | 9/2010 | Walhovd |
| 2012/0054061 A1* | 3/2012 | Fok .................... G06Q 30/0621 |
| | | 73/865.8 |
| 2014/0144078 A1* | 5/2014 | Gonyer .................. A01G 31/02 |
| | | 47/62 A |
| 2014/0259920 A1* | 9/2014 | Wilson .................. A01G 7/045 |
| | | 47/62 R |
| 2015/0342133 A1 | 12/2015 | Nakajima et al. |
| 2016/0037738 A1 | 2/2016 | Kato et al. |
| 2016/0135396 A1 | 5/2016 | Day |
| 2016/0270303 A1 | 9/2016 | Cooley et al. |
| 2016/0270310 A1 | 9/2016 | Botman |
| 2017/0258010 A1 | 9/2017 | Nakaminami et al. |
| 2017/0265408 A1 | 9/2017 | McGowan et al. |
| 2019/0335691 A1* | 11/2019 | Krakover ............... A01G 31/06 |

\* cited by examiner

MODULAR COMMERCIAL PLANT CLONING SYSTEM

CROSS REFERENCE TO RELATED APPLICATIONS

This application is a divisional application of U.S. patent application Ser. No. 17/117,754 filed on Dec. 10, 2020, pending, which claims the benefit of U.S. Provisional Application No. 62/946,825 filed on Dec. 11, 2019. The above identified patent applications are herein incorporated by reference in their entirety to provide continuity of disclosure.

FIELD OF THE INVENTION

The present invention relates to cloning and growing plants. More specifically, the present invention pertains to a modular commercial plant cloning system having a wheeled supporting frame which is removably securable to adjacent support frames to create a plant cloning network for commercial use.

BACKGROUND OF THE INVENTION

In order to properly clone a plant, a cutting is taken from the stem, which is then carefully managed to stimulate root growth. Generally, this cloning environment must be carefully maintained within a specific temperature and humidity range, in order to ensure that the plant stem is not damaged. Even in cases where the temperature is not a direct cause of damage, bacteria responsible for reducing plant growth can thrive within certain otherwise acceptable temperature ranges. Generally speaking, the ideal temperature range for proper root growth stimulation is between 75-80 degrees Fahrenheit. Due to heat buildup within the plant cloning apparatus, in order to maintain such a temperature without the aid of a cooling unit, the room in which the plant cloning apparatus is stored must be maintained at a much cooler temperature, such as between 50-55 degrees Fahrenheit. Such low temperatures can often be untenable in living and working environments.

Existing plant cloning apparatuses often utilize a submersible pump to deliver liquid to the plant stem, thereby providing the plant stem with the proper nutrients to grow. Often, the liquid is not directly cooled, leading to inefficient heat transfer within the plant cloning apparatus. External fans or repeated introduction of ice to the water reservoir each have several drawbacks, namely inefficient cooling and fluctuations of internal temperature interfering with plant growth. Additionally, such plant cloning apparatuses are often small-scale, preventing rapid growth and development of several cloned plants simultaneously.

Various types of plant cloning apparatuses have been developed over time. These devices, however, do not allow for an individual to assemble several separate frames together in a modular manner, wherein each frame further includes a variety of plant support inserts for different plant size and spacing concerns. In order to address these concerns, the present invention provides a modular plant cloning system. The system includes a supporting frame, a fluid reservoir, and a cooling element. The supporting frame further includes a plurality of mounting points that are useable to secure plant supporting trays at a desired height and spacing within the supporting frame. A lower end of the frame includes a fluid reservoir, wherein the fluid reservoir further includes a cooling element therein. Several supporting frames can be removably secured to each other via fasteners disposed thereon, thereby creating a network of interconnected frames. Each frame further includes a plurality of castor wheels on a lower end thereof, wherein each castor wheel is pivotally secured and capable of locking in a desired position.

In light of the devices disclosed in the known art, it is submitted that the present invention substantially diverges in design elements from the prior art and consequently it is clear that there is a need in the art for an improvement to existing self-contained plant cloning systems. In his regard the instant invention substantially fulfills these needs.

SUMMARY OF THE INVENTION

In view of the foregoing disadvantages inherent in the known types of commercial plant cloning systems now present in the prior art, the present invention provides a new modular commercial plant cloning system wherein plants can grow in a commercial setting on a wheeled supporting frame that is removably securable to adjacent supporting frames and the plants can have regulated environment settings in order to stimulate root growth.

It is therefore an object of the present invention to provide a modular, commercial system for plant cloning that includes an arrangement of a plurality of plant holding devices each configured to house individual plant stems to maximize efficiency of growth. A plant holding device tray secures the plant holding devices in place on a multi-tiered support frame structure. The arrangement increases the output than the currently available options for plant cloning. A plurality of lights disposed above each plant holding device connect to a power source to provide illumination. The support frame comprises a plurality of mounting points to secure plant holding device trays and a plurality of castor wheels pivotally secured to the lower end of the supporting frame. Additionally, the system has a fluid delivery method that comprise a fluid reservoir, a plurality of sprayer nozzles, a plurality of fluid lines, and a pump. Together, the fluid delivery system helps transport fluid housed in the fluid reservoir to the sprayer nozzles which are configured to distribute fluid across the plant stems disposed within the plant holding device. Moreover, the system comprises a cooling element that is configured to modify the temperature of the fluid stored in the fluid reservoir to a desired temperature. In some embodiments where multiple support frames are connected, a gas refrigerant may be necessary to readily absorb heat and provide refrigeration within the fluid reservoir.

In one embodiment of the present invention, the plant holding device component of the system includes opposing housing units that are joined to each other by coupling a shallow aperture with an opposing protuberance. When joined, the plant holding device will have a plurality of openings that extend through the top surface and the bottom surface of the plant holding device, such that the openings encircle the individual plant stems. Moreover, the system can be configured such that the plant holding devices are secured in the plurality of cavities disposed on the top face of the plant holding device tray and are arranged to maximize the efficiency of the overall system by maximizing fluid distribution to the plant stems housed within the plant holding devices.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
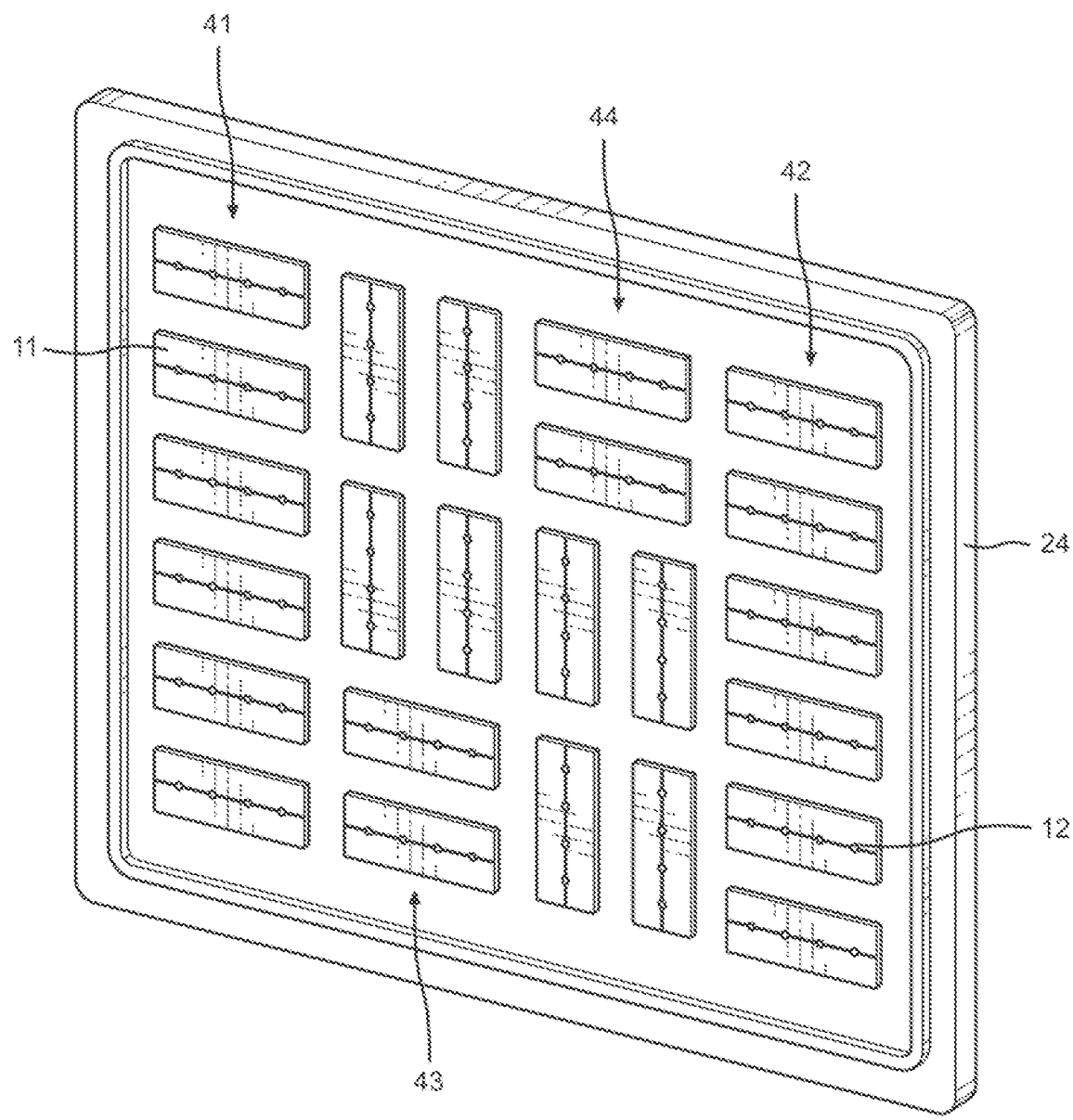
FIG. 1 shows a perspective view of a plant holding device tray from an embodiment of the modular commercial plant cloning system.

Reference is made herein to the attached drawings. Like reference numerals are used throughout the drawings to depict like or similar elements of the commercial plant cloning system. For the purposes of presenting a brief and clear description of the present invention, the preferred embodiment will be discussed as used for regulating the temperature of the environment within the commercial plant cloning system for stimulating root growth of a plant stem. The figures are intended for representative purposes only and should not be considered to be limiting in any respect.

Referring now to FIG. 1, there is shown a perspective view of a plant holding device tray 24 from an embodiment of the modular commercial plant cloning system. In the illustrated embodiments, a plurality of plant holding devices 11 are removably secured within the plant holding device tray 24 in an array to maximize the efficiency of a fluid distribution via a plurality of spray nozzles. The plant holding devices 11 have an exposed top surface when they are placed within the plant holding device tray 24. A projected ledge encircles the plant holding device 11 rests upon plant holding device tray 24, while a bottom surface of the plant holding device 11 is submerged below the surface of the plant holding device tray 24. In the shown embodiment, a first column 41 and last column 42 of plant holding devices 11 are disposed parallel to each other in a horizontal configuration, whereas a second column 43 and a third column 44 comprise a pair of plant holding devices 11 in the same configuration as the first 41 and last columns 42, while each remaining plant holding device 11 of the second 43 and third columns 44 is disposed perpendicularly relative to the first 41 and last 42 column. In this manner, the user is ensured even distribution of fluid 30 over plant stems 31 placed within the plant holding devices 11, maximizing efficiency of growth thereof.

Figure 2:
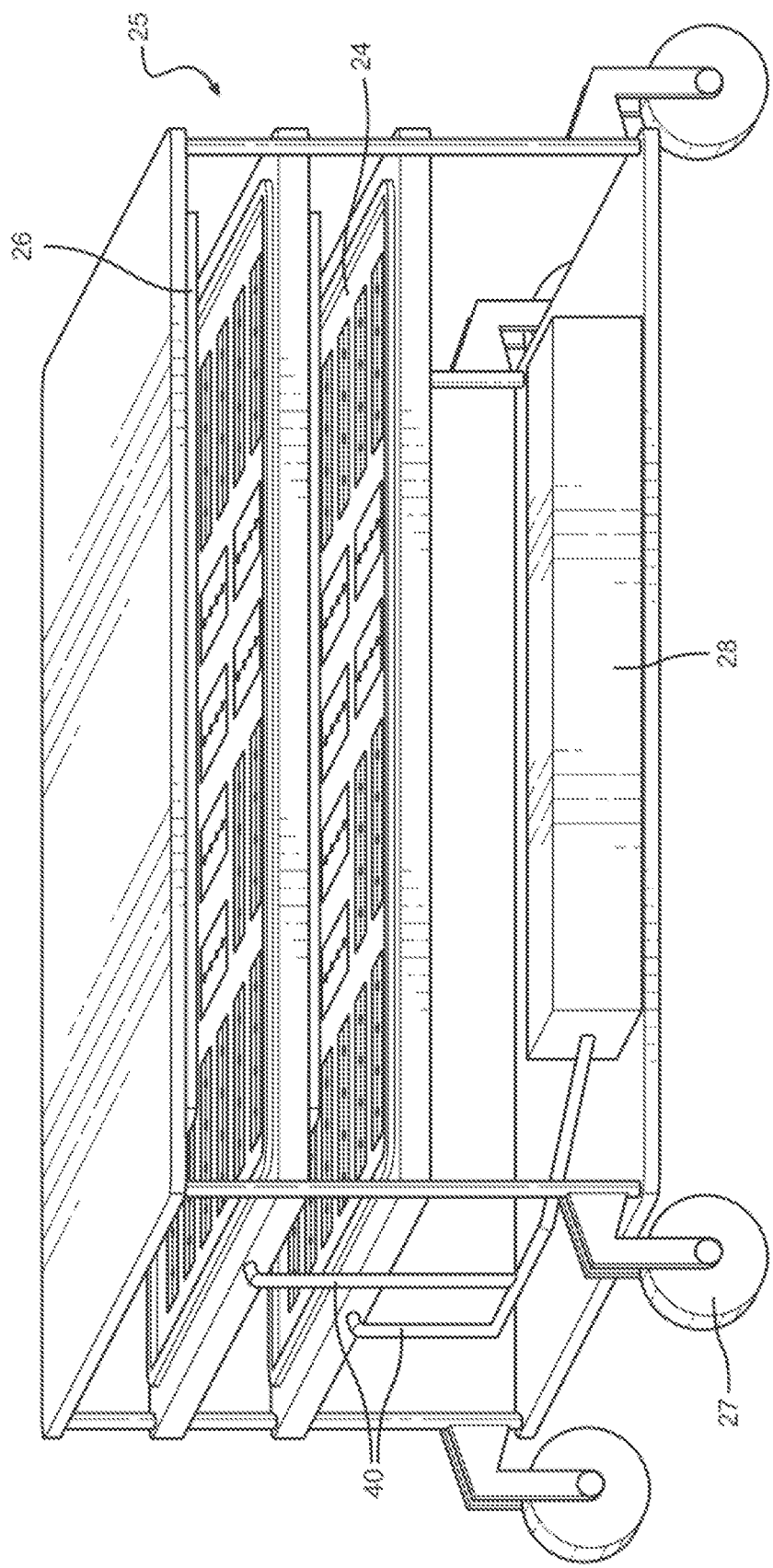
FIG. 2 shows a perspective view of an embodiment of the modular commercial plant cloning system.

Referring now to FIG. 2, there is shown a perspective view of an embodiment of the modular commercial plant cloning system. In the shown embodiment, the modular commercial plant cloning system 25 has a multi-tiered support frame comprising a plurality of mounting points configured to secure plant holding device trays 24 to the multi-tiered support frame. A plurality of castor wheels 27 are pivotally secured to a lower end of the supporting frame. Each castor wheel of the plurality of castor wheels 27 is pivotally secured and capable of locking in a desired position. Locking the castor wheels 27 prevents any undesired movement of the modular commercial plant cloning system 25.

Each plant holding device tray 24 of the modular plant cloning system is illuminated by a plurality of lights 26. The plurality of lights 26 is secured to the support frame of the modular commercial plant cloning system 25 above each plant holding device tray 24. The plurality of lights 26 is operably connected to a power source. The plurality of lights 26 provide illumination to the plant stems disposed within the plant holding device placed in the plurality of lights 26. In this manner, the plant stems are provided essential UV light to stimulate growth.

Additionally, the system contains a fluid delivery method. The fluid delivery method comprises a fluid reservoir 28, a plurality of sprayer nozzles, a plurality of fluid lines, and a submersible pump. Together, the fluid delivery system helps transport the fluid housed within the fluid reservoir 28 to the sprayer nozzles. The sprayer nozzles are configured to distribute fluid across the plant stems disposed within the plant holding device. Moreover, the system comprises a cooling element 46 that is configured to reduce the temperature of the fluid 30 stored in the fluid reservoir 28 to a desired temperature. In other embodiments, the cooling element is configured to allow the user to reverse the polarity thereof, such that the cooling element can be used to regulate temperature via heating as well. Also, the system comprises a plurality of lights 26 disposed above each plant holding device tray 24 and connected to a power source to provide illumination.

Figure 3:
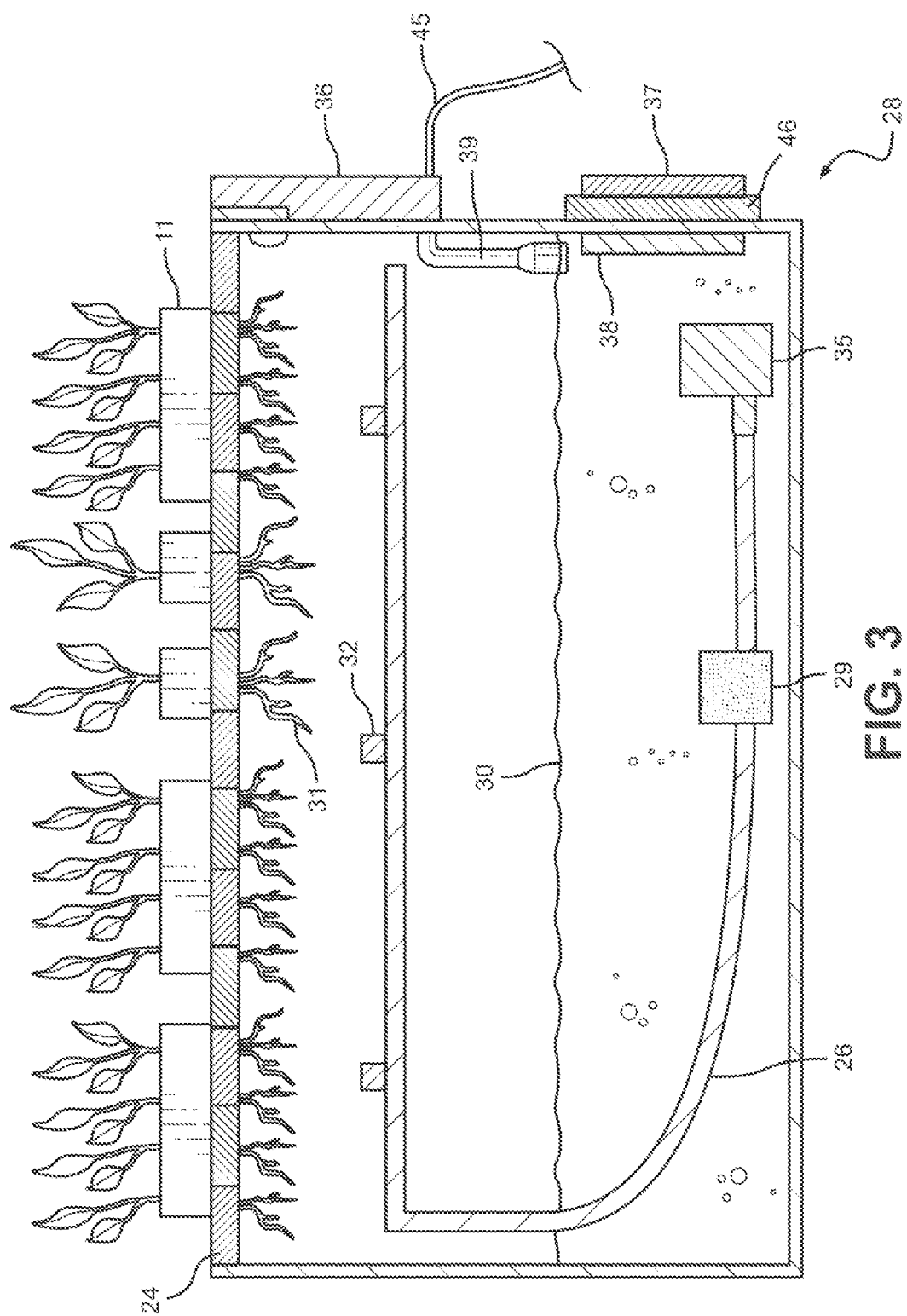
FIG. 3 shows a perspective view of an alternative embodiment of the modular commercial plant cloning system.

Referring now to FIG. 3, there is shown a perspective view of an alternative embodiment of the modular commercial plant cloning system. In the shown embodiment, the modular commercial plant cloning system comprises a control unit 36 disposed on the exterior of the fluid reservoir 28. The control unit 36 is operably connected to an exhaust fan 37, a submersible pump 35, a thermoelectric cooler 38, a temperature sensor 39, and the power source 45. However, in alternate embodiments, the control unit 36 can be a remote device, such as a software application or smartphone, for example. In the illustrated embodiment, the control unit 36 further comprises a display, a microprocessor, a timer, a memory, and a user interface.

The user interface comprises a plurality of controls that allows a user to selectively turn on and off the exhaust fan 37, submersible pump 35 and thermoelectric cooler 38. In some embodiments, the user interface comprises a touchscreen. In other embodiments, the user interface comprises a keypad or keyboard. The microprocessor is configured to communicate a user's input data with the various operating components of the system. The memory is configured to store programmed lengths of time in which the submersible pump 35 should be operated.

The plant holding device tray 24 is placed above the fluid reserve with the plant stems 31 exposed to the spray nozzles 32 for them to disperse fluids to the plants. The timer is further operably connected to the submersible pump 35. In operation, a user can set the length of time or a period of intermittent times via the timer in which the submersible pump 35 will operate. Submersible pump 35 operation is defined as forcing water through the spray nozzles 32 and circulating the liquid disposed in the reservoir 28. As the plant holding devices 11 are placed in the plant holding device tray 24, the fluid 30 will be dispersed by the spray nozzles 32 and distributed across the plant stems 31 that are placed with the inverted cone cavities 20. The arrangement of the plant holding devices 11 in the plant holding device tray 24 allow for the spray nozzles 32 to maximize the efficiency of fluid distribution.

A power source 45 is disposed within the system to power the control unit 36, submersible pump 35, thermoelectric cooler 38, and light sources 26. The temperature sensor 39 is disposed in the fluid reservoir 28 and adapted to be submerged in the liquid. The temperature sensor 39 measures the temperature and displays the measurement on the display. The embodiment in FIG. 8, has the submersible pump 35 and thermoelectric cooler configured to operate simultaneously. Moreover, the thermoelectric cooler 38 is configured to reduce the temperature of the fluid 30 stored in the fluid reservoir 28 to a desired temperature. However, in other embodiments, the fluid reservoir 28 further comprises an agitator configured to circulate the liquid to allow the liquid to cool through the cool side of the thermoelectric cooler 38 when the submersible pump 35 is not operated. It is an objective of the system to maintain an environment having a stable temperature, wherein the temperature can be controlled to a degree. In being able to do so, the fluid reservoir 28 is configured to maintain the internal temperature thereof, unless otherwise selectively adjusted via the control unit 36. In one embodiment, an auto sensing potential hydrogen ("pH") adjustment is operably connected to the control unit 36 and the power source 45. The auto sensing pH adjustment comprises a sensor and an acid pump. The sensor may be continuously submerged in the fluid 30 stored in the fluid reservoir 28 to monitor the pH level of the fluid 30. The sensor includes a threshold pH level that the fluid 30 must maintain. The parameters of the threshold pH level may be set by the user on the control unit 36. When the pH level of the fluid 30 is beyond the threshold pH level, the sensor will activate the acid pump. The acid pump will disperse a proper acidic or basic solution to the place the pH level of the fluid 30 back within the threshold pH level.

Figure 4:
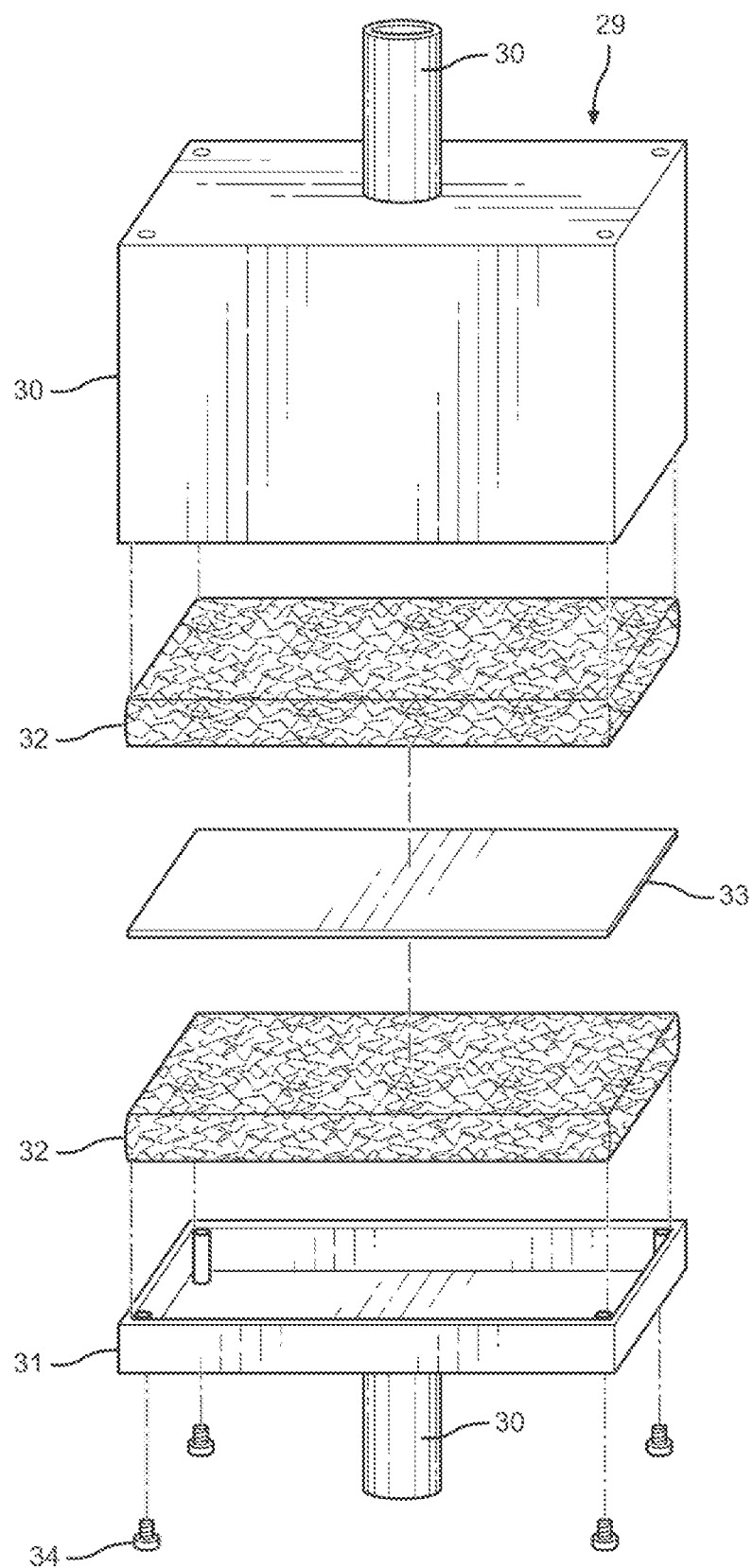
FIG. 4 shows an exploded perspective view of an example fluid reservoir filtration system from an embodiment of the modular commercial plant cloning system.

Referring now to FIG. 4, there is shown an exploded perspective view of an example fluid reservoir filtration system from an embodiment of the modular commercial plant cloning system. In the shown embodiment, the fluid reservoir 28 includes an activated charcoal filtration system 29. The activated charcoal filtration system 29 comprises a container 30 and a corresponding lid 31. The container 30 and the corresponding lid 31 are coupled together with fasteners, such as screws 34, to form an enclosed box. An inlet aperture is disposed on the face of the lid 31. A pipe 30 is inserted into the inlet aperture to allow the fluid lines 26 to attach to the activated charcoal filtration system 29 and permit the fluid 30 to enter the activated charcoal filtration system 29. The side of the container 30 that is opposite of the lid 31 has an outlet aperture disposed on its face. Like the inlet aperture, the outlet aperture has a pipe 30 inserted into it to allow the fluid lines 26 to transport the fluid away from the activated charcoal filtration system 29 to the spray nozzles 32. The activated charcoal filtration system 29 promotes the removal of some of the acidity with plants that clone at a high pH level and removes debris that harbors bacteria. In embodiments incorporating plants that clone at a low pH level, a non-activated charcoal bag filter is preferred.

The activated charcoal filtration system 29 further comprises a plurality of replaceable filters that are housed inside the enclosed box. In one embodiment of the activated charcoal filtration system 29, the plurality of replaceable filters includes a single sheet of polyester filtration 33 sandwiched between a pair of vermiculated foam activated charcoal mats 32. In this manner, the returned fluid 30 from the plant holding device trays 24 is purified to ensure minimal contaminants are fed to the plant cuttings 31 via the spray nozzles 32 upon repeated use of the same fluid 30.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claimed invention.

I claim:

1. A modular plant cloning system, comprising:
a plurality of plant holding devices each having a lid;
wherein the lid has an inlet aperture disposed on the face of a lid to allow a fluid line to be inserted therethrough;
whereby the fluid line is attached to a replaceable filter having a single sheet of Polyester filtration sandwiched between a pair of vermiculated foam activated charcoal mats;
a plurality of plant holding device trays;
one or more supporting frames;
a fluid reservoir configured to store fluid;
wherein the fluid reservoir is disposed on a lower platform of the supporting frame;
a plurality of sprayer nozzles configured to distribute fluid across plant cuttings disposed within the plant holding device tray;
a plurality of fluid lines configured to transport fluid from the fluid reservoir to the sprayer nozzles;
wherein each fluid line of the plurality of fluid lines has a first end connected to the fluid reservoir and a second end connected to the sprayer nozzles;
a pump operably connected to each fluid line, the pump configured to drive fluid from the fluid reservoir to the sprayer nozzles;
a cooling element operably connected to the fluid reservoir, wherein the cooling element is configured to modify the temperature of the fluid stored in the fluid reservoir to a desired temperature; and
a plurality of lights disposed above each plant holding device tray.

2. The modular plant cloning system of claim 1, wherein the supporting frames further include a multi-tiered structure comprising a plurality of mounting points configured to secure plant holding device trays and a plurality of castor wheels pivotally secured to a lower end of the supporting frame.

3. The supporting frame of claim 2, wherein the plurality of castor wheels is further configured to selectively lock the castor wheels to prevent rotation or movement.

4. The modular plant cloning system of claim 1, wherein the plurality of lights is operably connected to a power source to provide illumination.

5. The modular plant cloning system of claim 1, wherein the supporting frame further comprises one or more fasteners disposed in a linear configuration to removably secure multiple supporting frames to each other.

6. The modular plant cloning system of claim 1, wherein the fluid reservoir is configured to collect excess fluid dispensed by the sprayer nozzle through the plant holding device tray and return to the fluid reservoir in a closed loop.

7. The modular plant cloning system of claim 1, wherein the fluid reservoir is further comprising an activated charcoal filtration system coupled with the fluid lines between the pump and the plurality of sprayer nozzle.

\* \* \* \* \*